United States Patent
Montrichard et al.

(10) Patent No.: US 10,230,574 B2
(45) Date of Patent: Mar. 12, 2019

(54) AVIONICS CALCULATOR WITH INTEGRATED ROUTING MODULE, RELATED COMMUNICATION NETWORK AND COMMUNICATION INSTALLATION, AND AIRCRAFT COMPRISING SUCH A COMMUNICATION INSTALLATION

(71) Applicant: THALES, Courbevoie (FR)

(72) Inventors: Martial Montrichard, Toulouse (FR); Benoit Pierson, Toulouse (FR); Marc Fumey, Toulouse (FR)

(73) Assignee: THALES, Courbevoie (FR)

( * ) Notice: Subject to any disclaimer, the term of this patent is extended or adjusted under 35 U.S.C. 154(b) by 162 days.

(21) Appl. No.: 15/262,772

(22) Filed: Sep. 12, 2016

(65) Prior Publication Data

US 2017/0078142 A1 Mar. 16, 2017

(30) Foreign Application Priority Data

Sep. 11, 2015 (FR) ...................................... 15 01893

(51) Int. Cl.
| | |
|---|---|
| *H04L 12/24* | (2006.01) |
| *H04L 12/931* | (2013.01) |
| *H05K 5/00* | (2006.01) |
| *H04L 12/933* | (2013.01) |
| *H04B 1/3822* | (2015.01) |

(Continued)

(52) U.S. Cl.
CPC ....... *H04L 41/0806* (2013.01); *H04B 1/3822* (2013.01); *H04L 12/40176* (2013.01);
(Continued)

(58) Field of Classification Search
CPC .......... H04L 41/0806; H04L 12/40176; H04L 45/745; H04L 49/15; H04L 49/351;
(Continued)

(56) References Cited

U.S. PATENT DOCUMENTS

| | | | | |
|---|---|---|---|---|
| 5,627,955 A | * | 5/1997 | Gnirss ................... | G06F 17/509 345/441 |
| 9,553,658 B1 | * | 1/2017 | Bantoft .............. | H04B 7/18508 |

(Continued)

FOREIGN PATENT DOCUMENTS

| | | |
|---|---|---|
| EP | 1 469 652 A1 | 10/2004 |
| FR | 2 999 152 A1 | 6/2014 |

OTHER PUBLICATIONS

Pentar Avionics: "JETLAN AS200 Advanced Airborne Computer", Internet Citation, Sep. 2002 (Sep. 2002), XP002293451, Extra'it de l 'Internet: URL: http:/ /www.pentar. com/PDF/DS-AS200. pdf [extrait le Aug. 23, 2004].

FR Search Report, dated Jul. 13, 2016, from corresponding FR application.

*Primary Examiner* — Brian J. Gillis
*Assistant Examiner* — Chhian (Amy) Ling
(74) *Attorney, Agent, or Firm* — Young & Thompson (57) ABSTRACT

This avionic calculator, intended to be loaded on board an aircraft, the avionic calculator includes a protective casing and at least one module from among an information processing module able to execute at least one software application, an input/output management module and an electric power supply management module, each module being positioned inside the casing. The avionic calculator further includes a routing module positioned inside the casing, the routing module including several communication ports and being configured for transmitting at least one message from an input communication port to an output communication port.

16 Claims, 4 Drawing Sheets

(51) Int. Cl.
    *H04L 29/08*     (2006.01)
    *H04L 12/741*    (2013.01)
    *H04L 12/40*     (2006.01)

(52) U.S. Cl.
    CPC ............ *H04L 45/745* (2013.01); *H04L 49/15* (2013.01); *H04L 49/351* (2013.01); *H04L 49/405* (2013.01); *H04L 67/12* (2013.01); *H05K 5/0017* (2013.01); *H04L 2012/4028* (2013.01); *H04L 2012/40208* (2013.01)

(58) Field of Classification Search
    CPC ................ H04L 49/405; H04L 67/12; H04L 2012/4028; H04L 2012/40208; H04B 1/3822; H05K 5/0017
    See application file for complete search history.

(56) References Cited

U.S. PATENT DOCUMENTS

| | | | | |
|---|---|---|---|---|
| 2004/0180653 | A1* | 9/2004 | Royalty | B64D 47/00 |
| | | | | 455/431 |
| 2006/0215568 | A1* | 9/2006 | Smith | H04L 43/12 |
| | | | | 370/241 |
| 2007/0230330 | A1* | 10/2007 | Dietz | H04L 49/15 |
| | | | | 370/216 |
| 2014/0180504 | A1 | 6/2014 | Fervel et al. | |
| 2014/0258532 | A1* | 9/2014 | Weis | H04L 43/0811 |
| | | | | 709/225 |
| 2015/0103825 | A1* | 4/2015 | Bobrek | H04L 45/745 |
| | | | | 370/392 |
| 2016/0366239 | A1* | 12/2016 | Rabeela | H04L 67/2819 |

\* cited by examiner

AVIONICS CALCULATOR WITH INTEGRATED ROUTING MODULE, RELATED COMMUNICATION NETWORK AND COMMUNICATION INSTALLATION, AND AIRCRAFT COMPRISING SUCH A COMMUNICATION INSTALLATION

FIELD OF THE INVENTION

The present invention relates to an avionics calculator, intended to be put on board an aircraft.

The present invention also relates to a communications network, comprising several network switches, each network switch including several communication ports.

The invention also relates to a communication installation comprising several pieces of electronic equipment and such a communication network.

The invention also relates to an aircraft comprising such a communication installation.

The invention more particularly relates to the field of avionic communication networks, installed onboard aircraft, comprising network switches which are preferably compliant with the ARINC 664 standard.

The invention also relates to the field of redundant communication networks, i.e. communication networks comprising several network switches and allowing several communication paths via different network switches. Such redundant networks allow data communication between two pieces of electronic equipment connected to the communication network in spite of the failure of one of the network switches.

BACKGROUND OF THE INVENTION

An avionic communication network with redundancy is known, such a network comprising two independent communication channels, also called communication planes (plane A, plane B), laid out in parallel (or as a mirror). Each communication plane includes one or several network switches, the network switches of each plane being connected with each other if necessary. Two successive network switches of a communication plane are connected together through a bidirectional data link in order to allow communication of data in both directions between both network switches. Each network switch is achieved in the form of a dedicated electronic apparatus according to the ARINC 664 standard.

The pieces of electronic equipment, also called subscriber pieces of equipment having to communicate via this network of switches are connected to a switch of each communication chain in order to obtain communication redundancy via both planes in parallel. The number of network switches is preferably identical from one communication plane to the other, and the communication network is then said to be in mirror planes (Plane A, Plane B).

However, such a communication network is particularly complex with many network switches and pieces of subscriber equipment.

SUMMARY OF THE INVENTION

The object of the invention is therefore to propose an avionic calculator giving the possibility of simplifying the communication within the aircraft.

For this purpose, the object of the invention is an avionic calculator, intended to be loaded on board an aircraft, the avionic calculator comprising:

a protective casing, at least one module from among an information processing module capable of executing at least one software application, an input/output management module and an electric power supply management module, each module being positioned inside the casing, a routing module positioned inside the casing, the routing module including several communication ports and being configured so as to transmit at least one message from an input communication port towards an output communication port, and a data transceiver module positioned inside the casing, the transceiver module being configured so as to be connected to at least one of the modules belonging to the group comprising:

the routing module positioned inside the casing, another routing module, external to the avionic calculator.

The avionic calculator according to the invention then gives the possibility, by further integrating a routing module positioned inside its casing, of simplifying in a significant way the communication network within the aircraft, by suppressing the need for additional network switches, and thus reducing the cost, the volume, the electric consumption and the weight of the electronics on board the aircraft. Indeed, the routing module integrated to this calculator is then configured for fulfilling the function of a network switch able to directly communicate with the or the other network switches.

In other words, the avionic calculator according to the invention fulfills its initial functionality(ies), such as a functionality for processing information applied by the information processing module and/or a functionality for managing the input/outputs applied by the input/output management module, and/or a functionality for managing the electric power supply applied by the electric power supply management module, while ensuring an additional functionality for routing messages from the input communication port towards the output communication port, this routing functionality being usually ensured by a dedicated network switch, external to an avionic calculator of the state of the art. The information processing functionality is for example a functionality for applying one or several avionic processes, such as flight management or further management of actuator(s) of the aircraft (braking, automatic pilot, etc . . . ), or a functionality for viewing information, or further a functionality for memory management, the memory having a size typically comprised between 2 Gb and 128 Gb.

The information processing module is then an electronic module preferably including a processor able to execute at least one software application, the application being an avionic application piece of software in the case of application of avionic processing operation(s), a graphic application in the case of information viewing and the processor then forming preferentially a graphic processor, or else being associated with a graphic processor, configured for building images and generating a display of information on a screen, or further a memory management application in the case of the memory management functionality. If necessary, the screen is remotely placed and dissociated from the information processing module, or else integrated to the information processing module.

Alternatively or additionally, the input/output management module is an electronic module configured for acquiring and/or emitting signals of the avionic type (discrete signals, analogue signals, ARINC 429 bus, CAN bus, etc . . . ), notably audio signals or radioelectric signals, the input/output management module then giving the possibility of acquiring pieces of information from sensors and/or controlling actuators of the aircraft.

Alternatively or additionally, the electric power supply management module is an electronic module including at least one electric energy converter, the electric power supply management module then being configured for delivering one or several power supply voltages to avionic pieces of equipment external to the calculator, from electric energy received from an electric network of the aircraft.

According to other advantageous aspects of the invention, the avionic calculator comprising one or several of the following features, taken individually or according to all the technically possible combinations:

- the routing-module is compliant with the ARINC 664 standard;
- the routing-module and at least partly the module(s) selected from the information processing module, the input/output management module and the electric power supply management module are made in the form of a single electronic board;
- the avionic calculator further comprises a supervisor positioned inside the casing, the supervisor being configured for supervising the routing module;
- the transceiver module includes at least one communication port and is connected to at least one module from among the information processing module and the input/output management module, and the avionic calculator further comprises an internal data link positioned inside the casing and connecting the transceiver module to the routing module in a bidirectional way;
- the routing module may be deactivated, and the transceiver module is then able to be connected to the other routing module, external to the avionic calculator, via said deactivated routing module and forming a gateway between the transceiver module and the external routing module;
- the routing module may be disconnected from the transceiver module, while being able to be connected to the other routing module, external to the avionic calculator;
- the routing module and the transceiver module are made in the form of a single electronic component;
- the routing module is configured so as to transmit at least one message from the input communication port to the output communication port, according to a first connection configuration table of the routing module to one or several external routing modules at a distance from the avionic calculator, and the transceiver module is configured for exchanging data, via at least one routing module, with pieces of avionic equipment external to the avionic calculator, according to a second connection configuration table of the avionic calculator with the pieces of avionic equipment;
- the first and second configuration tables are predefined and stored in the avionic calculator;
- the first and second configuration tables are distinct from each other;
- the first and second configuration tables form a single configuration table.

The object of the invention is also a communication network, adapted for interconnecting pieces of electronic equipment, the communication network comprising:

- an assembly of at least two network switches, each network switch including several communication ports, and
- at least one external data link, each external data link being configured so as to connect in a bidirectional way a network switch to another network switch of the assembly, via the corresponding communication ports,
- at least two distinct network switches being configured so as to be directly connected to a same piece of electronic equipment;
- wherein at least one of the network switches is applied via a routing module of an avionic calculator as defined above.

The object of the invention is also a communication installation, comprising several pieces of electronic equipment and a communication network positioned between the pieces of electronic equipment, the communication network being as defined above.

The object of the invention is also an aircraft comprising a communication installation as defined above.

BRIEF DESCRIPTION OF THE DRAWINGS

These features and advantages of the invention will become more clearly apparent upon reading the description which follows, only given as a non-limiting example and made with reference to the appended drawings, wherein.

Figure 1:
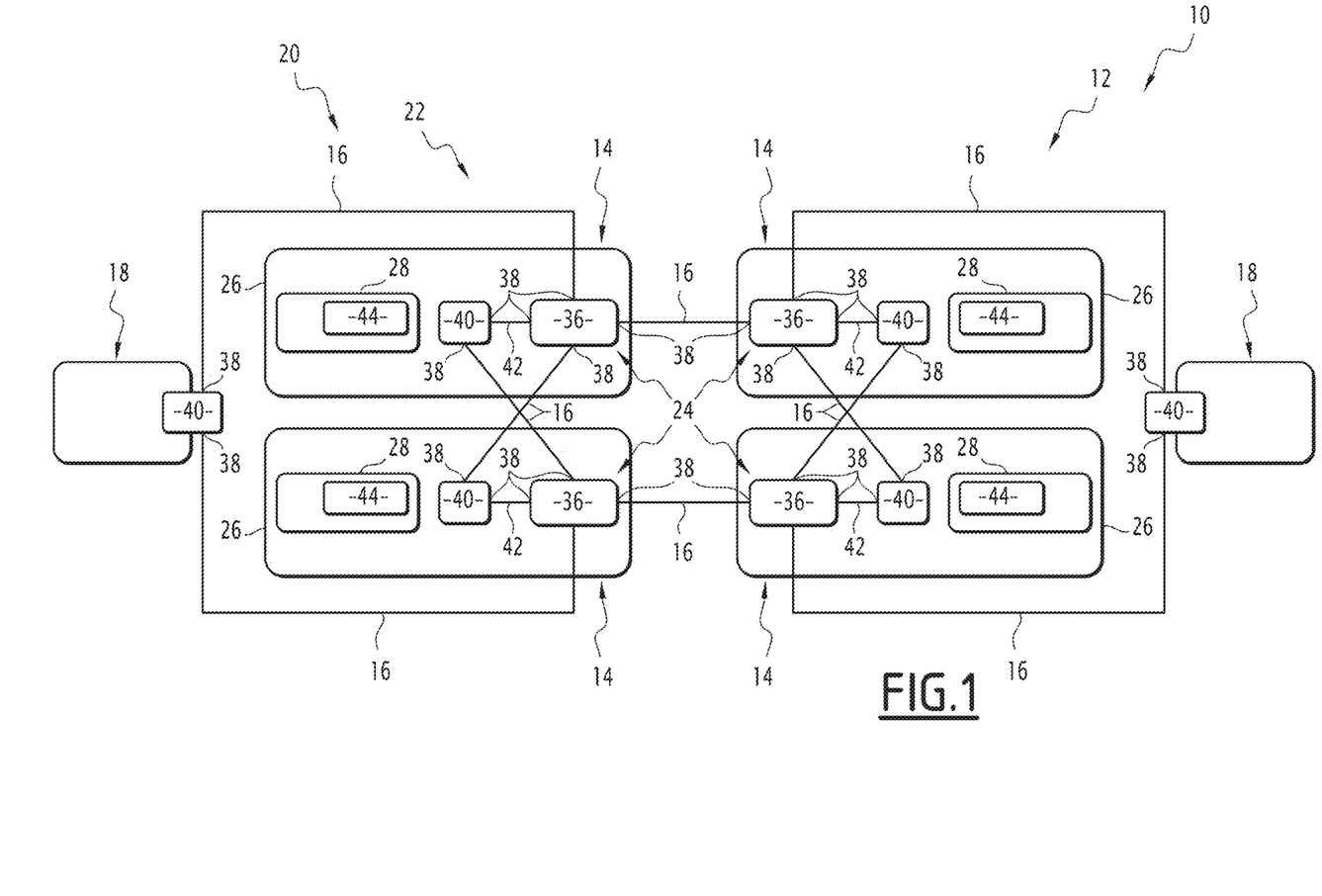
FIG. 1 is a schematic illustration of an aircraft equipped with a communication installation comprising two pieces of avionic equipment and a communication network positioned between the pieces of avionic equipment, the communication network being formed by four avionic calculators according to the invention, each calculator including a routing module.

In FIG. 1, an aircraft 10 comprises a communication installation 12. The aircraft 10 is preferably an airplane. Alternatively, the aircraft 10 is a helicopter, or further a drone remotely controlled by a pilot.

DETAILED DESCRIPTION OF PREFERRED EMBODIMENTS

The aircraft 10 comprises at least one avionic calculator 14, and preferably several avionic calculators 14. In the example of FIG. 1, the aircraft 10 includes four avionic calculators 14 interconnected together via external data links 16.

The communication installation 12 comprises several pieces of electronic equipment 18 and a communication network 20 positioned between the pieces of electronic equipment 18, said network 20 including a set 22 of at least two network switches 24 and a plurality of external data links 16 connecting the network switches 24.

The communication installation 12 is preferably an avionic installation intended to be laid out onboard the aircraft 10, and the pieces of electronic equipment 18 are then pieces of avionic equipment, preferably according to the ARINC 664 standard, each network switch 24 then also preferably being compliant to the ARINC 664 standard.

Each avionic calculator 14 is intended to be loaded on board the aircraft 10 and comprises a protective casing 26 forming the external shell of the avionic calculator.

Figure 2:
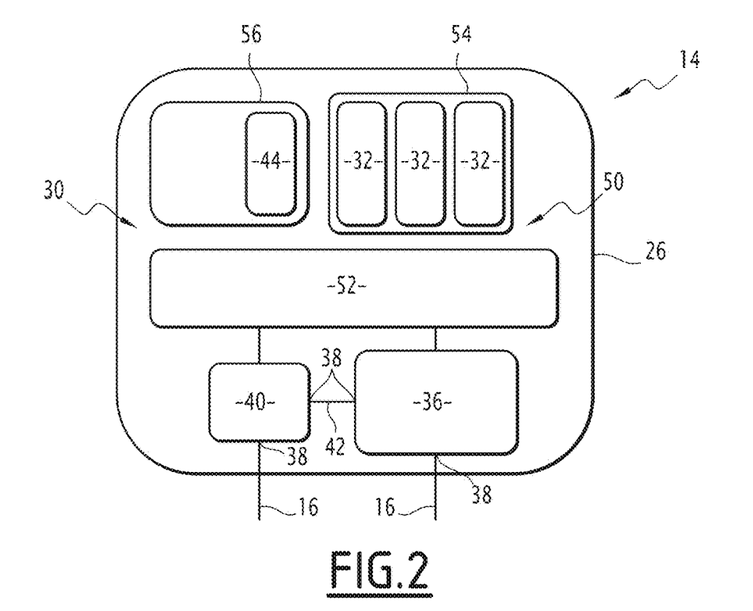
FIG. 2 is a schematic illustration of an avionic calculator of FIG. 1 according to a first exemplary embodiment.
Figure 4:
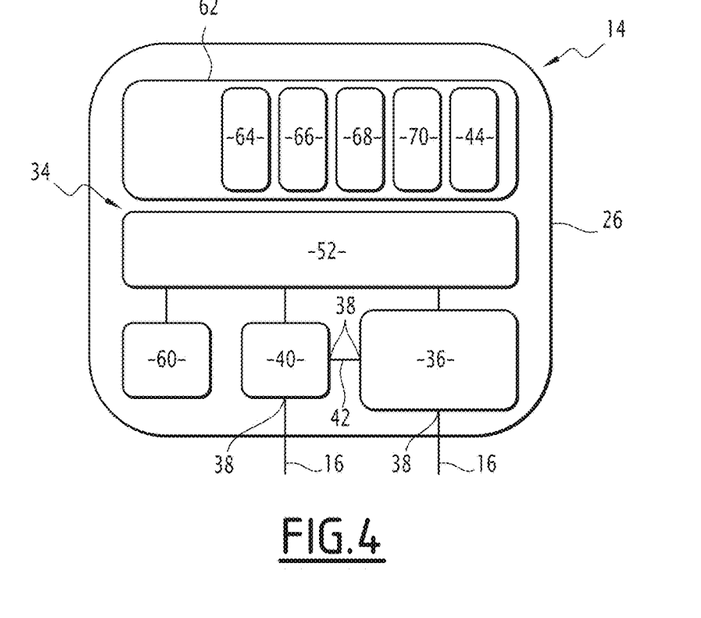

Each avionic calculator 14 also comprises at least one electronic module 28, also called a functional electronic module, selected from among an information processing module 30 able to execute at least one software application 32, visible in FIG. 2, an input/output management module 34, visible in FIG. 4, and a module, not shown, for managing an electric power supply, each functional electronic module 28 being positioned inside the casing 26.

According to the invention, each avionic calculator 14 further comprises a routing module 36 positioned inside the casing 26, the routing module 36 including several communication ports 38 and being configured for transmitting at least one message from one of the communication ports 38, forming an input communication port, to one of the communication ports 38, forming an output communication port.

In the example of FIG. 1, the avionic calculators 14 are then connected together via external links 16 and further form the communication network 20 because of the routing modules 36 integrated to each avionic calculator 14 and each fulfilling the routing function of a network switch.

Each avionic calculator 14 further comprises a module 40 for transceiving data, the transceiver module 40 including at least one communication port 38 and being connected to at least one functional electronic module 28 from among the information processing module 30, the input/output management module 34, and the electric power supply management module.

Each avionic calculator 14 further comprises an internal data link 42 positioned inside the casing 26 and connecting the transceiver module 40 to the routing module 36 in a bidirectional way.

Figure 5:
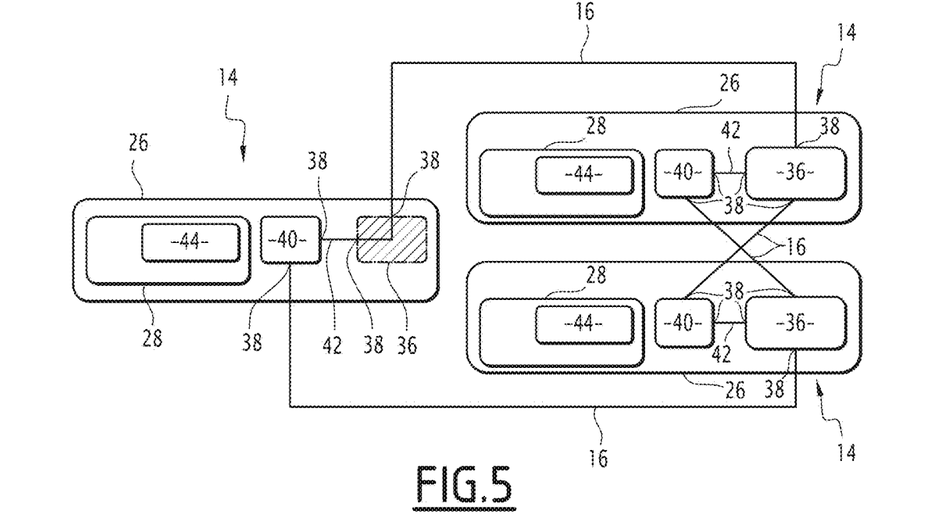
FIG. 5 is a schematic illustration of three avionic calculators of FIG. 1, connected together, one calculator of which having its routing module deactivated.

Additionally, optionally, at least one avionic calculator 14 further comprises a supervisor 44 positioned inside the casing 26, the supervisor 44 being configured for supervising the routing module 36. In the example of FIG. 1, each avionic calculator 14 comprises its own supervisor 44, the supervisor 44 then being preferably integrated to the functional electronic module 28. In the example of FIG. 5, each avionic calculator 14 also includes its own supervisor 44, the latter being also integrated into the functional electronic module 28.

Figure 6:
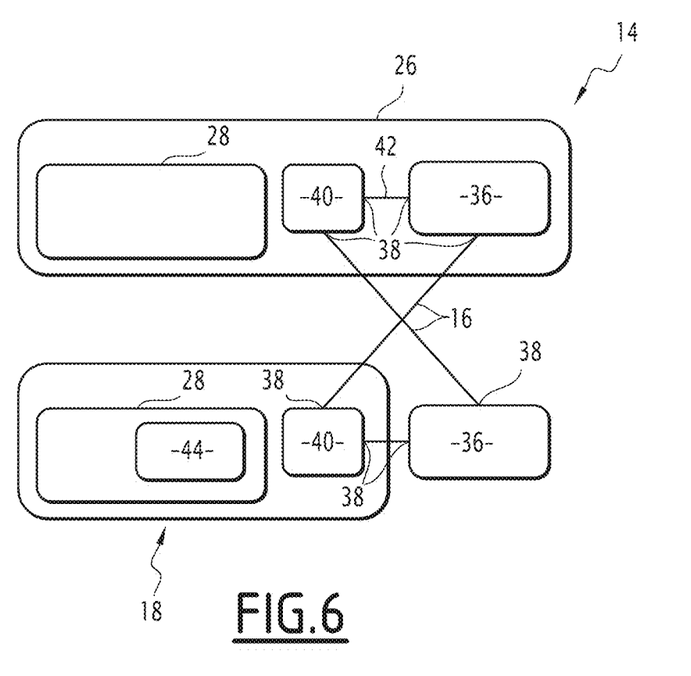
FIG. 6 is a schematic illustration of an avionic calculator of FIG. 1 integrating a routing module, connected to another remote calculator, this other remote calculator including a supervisor of the routing module.

Alternatively, as illustrated in FIG. 6, the supervisor 44 is included in a piece of electronic equipment at a distance from the avionic calculator 14, for example in a functional electronic module 28 of this piece of electronic equipment. According to this alternative, the supervisor 44 configured for supervising the routing module 36 integrated into the avionic calculator 14 according to the invention is then not positioned inside the casing 26 of said avionic calculator, but is remotely positioned in the piece of electronic equipment 18 external to the avionic calculator. The external piece of electronic equipment 18 includes its own transceiver module 40 and the routing module 36 integrated to the avionic calculator 14 is then connected to this transceiver module 40 included in the external piece of electronic equipment 18. According to this alternative, the supervisor 44 is configured for supervising the routing engine 36 which is associated with it via the communication network 20, in particular via the external data links 16.

In the example of FIG. 6, the transceiver module 40 integrated to the avionic calculator 14 and the transceiver module 40 included in the piece of electronic equipment 18 are each connected via a respective external link 16 to an independent routing module 36, which is both external to the avionic calculator 14 and to the piece of electronic equipment 18. The transceiver module 40 and the routing module 36 integrated into the avionic calculator 14 are also connected together via a corresponding internal link 42.

Each avionic calculator 14 and each piece of electronic equipment 18 is preferably an electronic apparatus of an avionic system, for example comprising one or several of the following systems: viewing system, alert system, system for managing the flight of the aircraft, also FMS (Flight Management System), a satellite positioning system, also called GPS (Global Positioning System), an inertial reference system, also called IRS (Inertial Reference System), a centralized maintenance or recording system, an automatic pilot system. More generally, these may be any piece of electronic equipment loaded on board the aircraft, including pieces of equipment for controlling onboard systems: engine, fuel, landing gear, braking, air conditioning, pressurization and fire detection.

By convention, in the subsequent description, each avionic calculator 14 corresponds to an avionic system electronic apparatus into which is integrated a respective routing engine 36, and each piece of electronic equipment 18 corresponds to an electronic apparatus of a subscriber to the communication network 20, while being without any routing module 36, the piece of electronic equipment 18 simply comprising a respective transceiver module 40.

Each external link 16 is configured in order to connect in a bidirectional way a network switch 24 to another network switch 24 of the assembly 22, via their corresponding communication port 38, or else a piece of electronic subscriber equipment 18 of a network switch 24, also via their corresponding communication port 38.

Each external link 16 is said to bidirectional when it allows transmission of data in both communication directions between both network switches 24 connected through said external link or else between the piece of subscriber equipment 18 and the corresponding network switch 24, from one to the other and vice versa.

Each external data link 16 is preferably an Ethernet connection. In particular, each external link 16 is preferably compliant with the ARINC 664 standard.

Each external link 16 is preferably a wired link, such as an electric connection or an optical fiber connection. Each external link 16 is configured in order to allow a certain data flow rate, for example comprised between 10 Megabits per second and 10 Gigabits per second.

Each piece of electronic equipment 18 comprises at least two distinct communication ports 38. In the example of FIG. 1, each piece of electronic equipment 18 includes a respective transceiver module 40, and said transceiver module 40 has exactly two communication ports 38.

Each piece of electronic equipment 18 of a subscriber to the communication network 20 is connected to at least two distinct network switches 24, via a respective communication port 38 for each network switch 24.

The communication network 20 comprises the set 22 of network switches 24 and the plurality of external links 16. The communication network 20 is configured for interconnecting the pieces of electronic equipment 18, so called pieces of subscriber equipment. The communication network 20 is preferably compliant with the ARINC 664 standard, each network switch 24 and the different external data links 16 then being compliant with the ARINC 664 standard.

At least two distinct network switches 24 are configured so as to be directly connected to a same piece of subscriber equipment 18, and this for each piece of subscriber equipment 18 in order to have a redundant communication network 20. In other words, each piece of electronic subscriber equipment 18 to the communication network is directly connected to at least two distinct network switches 24 of the communication network 20.

Each network switch 24 includes several communication ports 38, also called connection ports. Each network switch 24 is for example an Ethernet switch.

Each network switch 24 is then configured for transmitting at least one message from a communication port 38, a so called input port, to a communication port 38, a so called output port, according to a first configuration table 46 of the connections between the network switches 24 of the assembly 22.

All the network switches 24 of the assembly 22 are for example identical. This then allows improvement in the interoperability of the communication network 20.

The number of network switches 24 of the assembly 22 is greater than or equal to 3, and preferably equal to 3 or 4. In the example of FIG. 1, the number of network switches 24 is equal to 4. Such a number of network switches 24 gives the possibility of having a not very cumbersome and inexpensive communication network 20, while providing good reliability, in spite of the possible failure of a network switch 24.

In the example of FIG. 1, the network switches 24 of the assembly 22 are positioned following two communication planes (plane A, plane B) laid out in parallel (or as a mirror).

Alternatively, not shown, the network switches 24 of the assembly 22 are positioned following a network architecture as described in application FR 15 00647 filed on Mar. 31, 2015 by the applicant.

Further, according to the invention, at least one of the network switches 24 is applied via the routing module 36 of a respective avionic calculator 14. More specifically, at least one of the network switches 24 is formed by the routing module 36 and the associated supervisor 44, the routing module 36 and the associated supervisor 44 being integrated into a single avionic calculator 14 corresponding or else each integrated into a respective calculator, as described earlier.

In the example of FIG. 1, each network switch 24 is applied by the routing module 36 of a respective avionic calculator 14. In this example, each routing module 36 and each associated supervisor 44 forming each network switch 24 are every time integrated into a respective single avionic calculator 14.

Each protective casing 26 has reduced congestion, several avionic calculators 14 being able to be loaded inside the aircraft 10. Each protective casing 26 for example has dimensions of less than 1 m×1 m×1 m, preferably dimensions of less than 0.25 m×0.4 m×0.2 m, still preferably dimensions of less than 0.06 m×0.35 m×0.17 m.

Each electronic module 28 integrated into a corresponding avionic calculator 14 is configured for applying a function, such as an information processing function when the module 28 is an information processing module 30 able to execute at least one software application 32, or further such as an input/output management function when the module 28 is an input/output management module 34, or further such as a power supply management function when the module 28 is a power supply management module. Each electronic module 28 is then called a functional electronic module.

In the example of FIG. 2, the functional electronic module 28 integrated to the avionic calculator 14 is the information processing module 30 able to execute several software applications 32. The information treatment module 30 includes an information processing unit 50 for example formed with a processor 52, also called a CPU (Central Processing Unit) and with a memory 54 associated with the processor 52. The memory 54 is able to store several software applications 32, and the processor 52 is able to execute each of these software applications 32.

Additionally and optionally, the information processing module 30 further includes a supervision unit 56. In the example of FIG. 2, the supervision unit 56 includes the supervisor 44 of the routing module 36.

In other words, the information processing module 30 is an electronic module providing shared resources for processing information and thereby giving the possibility of receiving software applications 32. Each software application 32 is for example an avionic application piece of software able to apply one or several avionic processing operations; or a graphic application for viewing information, the processor 52 then preferentially forming a graphic processor, or else being associated a graphic processor, configured for building images and generating display of information on a screen; or further an application for managing a bulk storage memory, such as a memory having a size greater than 2 Gb, preferably comprised between 2 Gb and 128 Gb. If necessary, the screen, not shown, is remotely positioned and dissociated from the information processing module, or else integrated to the information processing module.

In the example of FIG. 2, the avionic calculator 14 then comprises the information processing module 30 and further the routing module 36, as well as the transceiver module 40, the routing module 36 and the transceiver module 40 being connected together through a corresponding internal link 42.

Figure 3:
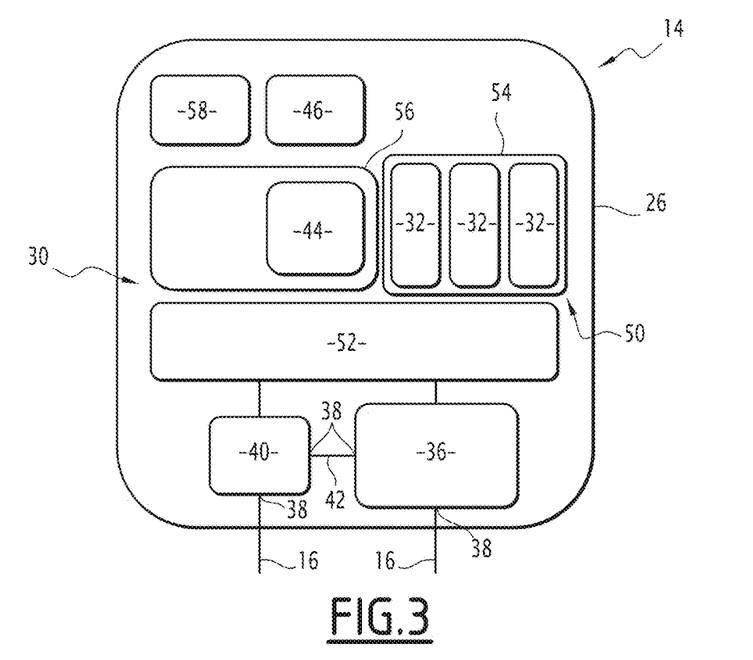
FIGS. 3 and 4 are similar views to the one of FIG. 2 according to a second exemplary embodiment, and respectively according to a third exemplary embodiment.

In the example of FIG. 3, the functional electronic module 28 integrated to the avionic calculator 14 is also the information processing module 30, and the avionic calculator 14 further comprises the first configuration table 46, the first configuration table 46 then containing the configurations of connection of the routing module 36 to one or several external modules 36 at a distance from the avionic calculator 14 and/or to one or several network switches 24 external to the avionic calculator 14. In the example of FIG. 3, the avionic calculator 14 further comprises a second configuration table 58, the second table 58 containing the connection configurations of the avionic calculator 14 with other avionic apparatuses, i.e. with other avionic calculators 14 and/or other pieces of subscriber equipment 18, the second configuration table 58 being used by the transceiver module 40.

In the example of FIG. 3, the first 46 and second 58 configuration tables are distinct from each other. Alternatively, not shown, the first and second configuration tables 46, 58 are made as a single configuration table.

The first 46 and second 58 configuration tables are for example each connected to the supervision unit 56. Alternatively, the first configuration table 46 is directly connected to the routing module 36.

The first 46 and second 58 configuration tables are preferably predefined and stored in the avionic calculator 14, as illustrated in FIG. 3.

In the example of FIG. 4, the functional electronic module 28 integrated to the avionic calculator 14 is the input/output management module 34. The input/output management module 34 is an electronic module configured for acquiring and/or emitting signals of the avionic type (discrete signals, analogue signals, ARINC 429 bus, CAN bus, etc . . . ), notably audio signals or radioelectric signals, the input/ output management module 34 then giving the possibility of acquiring information from sensors and/or controlling actuators of the aircraft 10.

The input/output management module 34 for example includes the processor 52, an input/output interface 60 and an input/output management unit 62. The input/output management unit 62 for example includes the supervisor 44 of the routing module 36. The input/outputs are input/outputs required for the operation of applications of the avionic system, such as discrete and/or analogue input/outputs and/or compliant with the ARINC 429 standard, and/or of the CAN type.

The input/output management unit 62 further comprises applications relating to the management of the input/outputs, such as an application for monitoring the input/output 64, an application for loading data 66, an application for concentrating data 68 or further another application 70.

In the example of FIG. 4, the avionic calculator 14 then comprises the input/output management module 34, and further the routing module 36 as well as the transceiver module 40, the routing module 36 and the transceiver module 40 being connected to each other through a corresponding internal link 42.

Alternatively, and not shown, the functional electronic module 28 integrated to the avionic calculator 14 is a power supply management module. The electric power supply management module is an electronic module including at least an electric energy converter, the electric power supply management module being then configured in order to provide one or several power supply voltages to pieces of avionic equipment external to the calculator, from electric energy received from an electric network of the aircraft. The electric energy converter is known per se, and for example is an AC-AC converter, or an AC-DC converter, a DC-AC converter, or further a DC-DC converter.

Still alternatively, not shown, the avionic calculator 14 comprises several modules from among the information processing module 30, the input/output management module 34 and the electric power supply management module.

Each routing module 36 includes several communication ports 38 and is configured for transmitting at least one message from an input communication port to an output communication port. Each routing module 36 is preferably compliant with the ARINC 664 standard.

Each routing module 36 is also called a routing engine (switch engine), and is configured for applying level 2 of the ISO model.

The routing module 36 and at least partly the functional electronic module(s) 28 integrated into the avionic calculator are preferably made as a single electronic board.

Alternatively and optionally, the routing module 36 may be used according to different operating modes:
- a normal mode, in which the routing module 36 is connected to at least one other module of the calculator 14 from among the functional module 28 and the transceiver module 40, and communicates with the module(s) 28, 40 to which it is connected;
- a deactivated mode, wherein the routing module 36 is connected to at least one other module of the calculator 14 from among the functional module 28 and the transceiver module 40, but by only forming a gateway between a piece of equipment external to the calculator 14, such as an external routing module, and said module from among the functional module 28 and the transceiver module 40; and
- a disconnected mode, wherein the routing module 36 is not connected to any other module of the calculator 14, while being able to be connected to another routing module 36, external to the avionic calculator 14.

When the routing module 36 is in a deactivated mode, the routing module 36 is also said to be configured in a transparent mode, the routing module 36 only forming a gateway.

The routing module 36 is always mechanically positioned inside the protective casing 26, regardless of the operating mode in which it is found, from among the normal, deactivated and disconnected modes.

In other words, the routing module 36 may be deactivated (passage into the deactivated mode), as illustrated in FIG. 5. The transceiver module 40 is then able to be connected to an external routing module 36 at a distance from the avionic calculator 14, via said deactivated routing module which forms a gateway between the transceiver module 40 and the external routing module 36. In other words, when the routing module 36 is deactivated, the routing module 36 is conducting and the avionic calculator 14 then behaves like a simple piece of subscriber electronic equipment 18.

Additionally or alternatively, the routing module 36 is disconnectable (passage into the disconnected mode, not shown) from the transceiver module 40, or even from any other module of the calculator 14 from among the functional module 28 and the transceiver module 40. When it is disconnected, the routing module 36 is nevertheless able to be connected to another routing module 36, external to said calculator 14 and at a distance from the latter. In the disconnected mode, the internal link 42 between the routing module 36 and the transceiver module 40 is then not used.

In the example of FIGS. 1 to 6, the routing module 36 and the transceiver module 40 are each made as a respective electronic component.

As an alternative, not shown, when the routing module 36 and the transceiver module 40 are positioned inside a single avionic calculator 14, the routing module 36 and the transceiver module 40 may also be made as a single electronic component, which allows further simplification of the architecture of the avionic calculator 14 according to the invention.

The transmission of messages by the routing module 36 from the input communication port to the output communication port is carried out according to the contents of the first configuration table 46 which defines the connection configurations of said routing module 36 with the other routing modules 36 and/or with the other network switches 24.

Each communication port 38 is for example an Ethernet port, in particular a port compliant with the ARINC 664 standard.

Each transceiver module 40 (a so called End System in the sense of the ARINC 664 standard part 7) is configured for exchanging data, via at least one corresponding routing module 36, with pieces of avionic equipment external to the avionic calculator 14, according to the second configuration table 58, this second configuration table 58 containing configuration information of the connections of this avionic calculator 14 with the other pieces of avionic equipment 18 and/or other avionic calculators.

Each transceiver module 40 is preferably compliant with the ARINC 664 standard, in particular with part 7 of this standard.

Each supervisor 44 is configured for carrying out supervision of the routing module 36, which is associated with it, in particular for carrying out one or several of the following actions relative to said routing module 36: starting, managing the configuration, updating, monitoring and managing failures.

Thus, the avionic calculator 14 according to the invention gives the possibility of reducing the number of pieces of equipment loaded onboard the aircraft 10 by integrating the routing module 36, while, in the state of the art, the latter is usually included in a dedicated network switch.

In the example of FIG. 1, all the network switches 24 are applied by routing modules 36 integrated into the respective avionic calculators 14, which then gives the possibility of doing without the four dedicated network switches.

The communication network 20 according to the invention then has reduced mass and bulk, as well as a lower electric consumption, because of the reduction in the number of apparatuses forming the communication network 20.

This also allows reduction in the maintenance costs of the aircraft 10.

The communication network 20 according to the invention also allows improvement of the wiring inside the aircraft 10, notably by limiting the number of external data links 16, certain data links being from now on internal to the avionic calculator 14, as described earlier with the internal link 42 between the transceiver module 40 and the routing module 36 when both of these modules 36, 40 are positioned inside a same and single protective casing 26.

Additionally and optionally, the fact that the routing module 36 is deactivatable allows further improvement in the development of the communication network 20, a single and same avionic calculator 14 may then operate either as a network switch, or as a calculator non-dedicated to the network, or like both at the same time.

It is thereby conceivable that the avionic calculator 14 according to the invention allows simplification of the communication within the aircraft 10.

The invention claimed is:

1. An avionic calculator loaded on board an aircraft, comprising:
   a protective casing;
   at least one processor;
   at least one electronic module from among an information processing module configured to execute at least one software application, an input/output management module, and a power supply management module, each module being positioned inside the casing;
   an electronic routing module positioned inside the casing, the routing module including a plurality of communication ports and being configured to transmit at least one message from an input communication port to an output communication port; and
   an electronic data transceiver module positioned inside the casing, the transceiver module being connected to at least one of the modules belonging to the group consisting of:
      the routing module positioned inside the casing, and
      an external routing module, within another avionic calculator and within the same aircraft;
   wherein the transceiver module includes at least one communication port and is connected to at least one module from among the information processing module and the input/output management module,
   wherein the avionic calculator further comprises an internal data link positioned inside the casing and connecting the transceiver module to the routing module in a bidirectional way, and
   wherein the routing module may be deactivated, and the transceiver module is then connectable to the external routing module, via said deactivated routing module and forming a gateway between the transceiver module and the external routing module.

2. The avionic calculator according to claim 1, wherein the routing module is compliant with the ARINC 664 standard.

3. A communication network, adapted to interconnect pieces of electronic equipment, the communication network comprising:
   an assembly of at least two network switches, each network switch including several communication ports; and
   at least one external data link, each external data link being configured so as to connect in a bidirectional way a network switch to another network switch of the assembly, via the corresponding communication ports,
   at least two distinct network switches being configured so as to be directly connected to a same piece of electronic equipment,
   wherein at least one of the network switches is applied via a routing module of an avionic calculator according to claim 2.

4. The avionic calculator according to claim 1, wherein the routing module and at least partly the module(s) selected from among the information processing module, the input/output management module and the electric power supply management module are made as a single electronic board.

5. A communication network, adapted to interconnect pieces of electronic equipment, the communication network comprising:
   an assembly of at least two network switches, each network switch including several communication ports; and
   at least one external data link, each external data link being configured so as to connect in a bidirectional way a network switch to another network switch of the assembly, via the corresponding communication ports,
   at least two distinct network switches being configured so as to be directly connected to a same piece of electronic equipment,
   wherein at least one of the network switches is applied via a routing module of an avionic calculator according to claim 4.

6. The avionic calculator according to claim 1, wherein the avionic calculator further comprises a supervisor positioned inside the casing, the supervisor being configured to supervise the routing module.

7. A communication network, adapted to interconnect pieces of electronic equipment, the communication network comprising:
   an assembly of at least two network switches, each network switch including several communication ports; and
   at least one external data link, each external data link being configured so as to connect in a bidirectional way a network switch to another network switch of the assembly, via the corresponding communication ports,
   at least two distinct network switches being configured so as to be directly connected to a same piece of electronic equipment,
   wherein at least one of the network switches is applied via a routing module of an avionic calculator according to claim 6.

8. The avionic calculator according to claim 1, wherein the routing module may be disconnected from the transceiver module, while being connectable to the external routing module.

9. The avionic calculator according to claim 1, wherein the routing module and the transceiver module are made as a single electronic component.

10. The avionic calculator according to claim 1,
wherein the routing module is configured to transmit at least one message from the input communication port to the output communication port, according to a first connection configuration table of the routing module to one or several external routing modules at a distance from the avionic calculator, and
wherein the transceiver module is configured to exchange data, via at least one routing module, with pieces of avionic equipment external to the avionic calculator, according to a second configuration table of connections of the avionic calculator with the pieces of avionic equipment.

11. The avionic calculator according to claim 10, wherein the first and second configuration tables are predefined and stored in the avionic calculator.

12. The avionic calculator according to claim 10, wherein the first and second configuration tables are distinct from each other.

13. The avionic calculator according to claim 10, wherein the first and second configuration tables form a single configuration table.

14. A communication network, adapted to interconnect pieces of electronic equipment, the communication network comprising:
an assembly of at least two network switches, each network switch including several communication ports; and
at least one external data link, each external data link being configured so as to connect in a bidirectional way a network switch to another network switch of the assembly, via the corresponding communication ports,
at least two distinct network switches being configured so as to be directly connected to a same piece of electronic equipment,
wherein at least one of the network switches is applied via a routing module of an avionic calculator according to claim 1.

15. A communication installation, comprising:
plural pieces of electronic equipment; and
a communication network positioned between the pieces of electronic equipment,
wherein the communication network is compliant with claim 14.

16. An aircraft comprising a communication installation, wherein the communication installation is according to claim 15.

* * * * *